United States Patent [19]

Bain

[11] 3,983,656

[45] Oct. 5, 1976

[54] FISHING LURE

[76] Inventor: Dewey L. Bain, 952 Lakeview Drive, Grenada, Miss. 38901

[22] Filed: Jan. 26, 1976

[21] Appl. No.: 652,235

[52] U.S. Cl.............................. 43/42.24; 43/42.31
[51] Int. Cl.² ....................................... A01K 85/00
[58] Field of Search.............. 43/17.1, 42.24, 42.26, 43/42.31, 42.34

[56] References Cited
UNITED STATES PATENTS

| | | | |
|---|---|---|---|
| 2,589,970 | 3/1952 | Shahan | 43/42.31 X |
| 3,096,598 | 7/1963 | Smolen | 43/42.31 X |
| 3,490,165 | 1/1970 | Thomassin | 43/42.24 X |
| 3,621,600 | 11/1971 | Dworski | 43/42.34 X |
| 3,724,116 | 4/1973 | Lindner et al. | 43/42.24 |

Primary Examiner—Louis G. Mancene
Assistant Examiner—Daniel J. Leach
Attorney, Agent, or Firm—Dennison, Dennison, Meserole & Pollack

[57] ABSTRACT

An elongated fishing lure formed, in the preferred embodiment, entirely of a soft, elastic, flexible and resilient plastic material which results in a lure freely deformable or manipulable under external forces. The lure includes an elongated body, a head at one end and a tail at the second end, with a series of integral outwardly projecting ribs at closely spaced points along the body, which ribs perform multiple significant functions including the selective trapping and release of air, the generation of clear acoustical signals, the increase in the visual bulk of the lure without affecting the flexibility thereof, the provision of means for facilitating movement of the lure over obstacles, etc.

12 Claims, 10 Drawing Figures

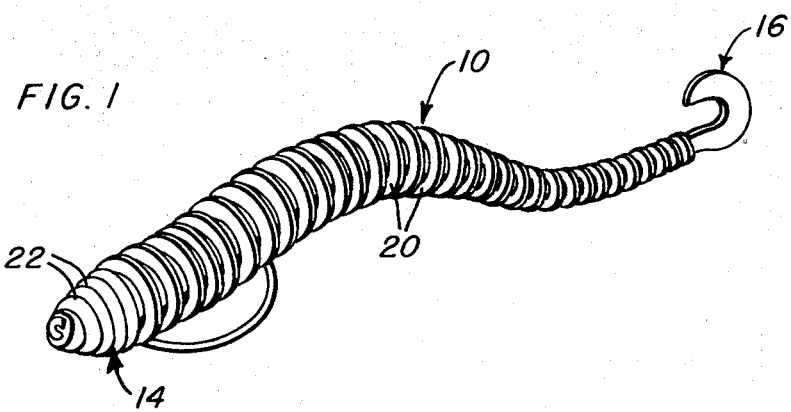
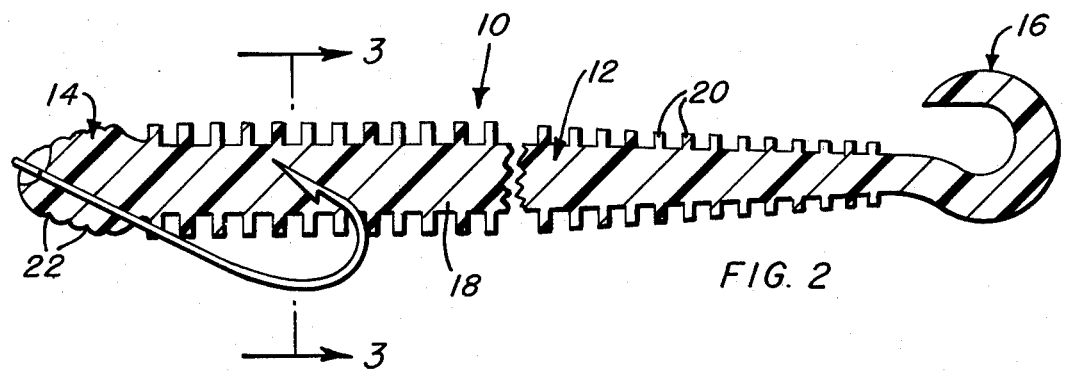
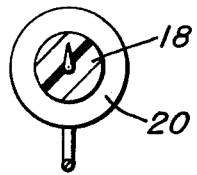 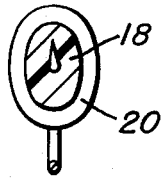 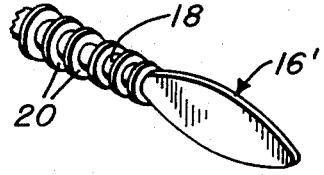

FISHING LURE

The invention herein generally relates to fishing lures, and is more particularly concerned with a unique lure which, while relatively simple in construction and capable of economical manufacture, incorporates significant advantages over known lures in performing the primary function of a lure, that is, the attraction of fish.

Examples of the prior art with which applicant is familiar are as follows:

| | |
|---|---|
| Des.192,510 | Stembridge |
| Des.222,585 | Smithwick |
| Des.228,761 | Cunningham |
| Des.223,988 | Best |
| 559,293 | Kitchen |
| 2,971,285 | Murawski |
| 3,490,165 | Thomassin |
| 3,631,626 | Keenan |
| 3,802,115 | Auten et al |

| Name of Worm | Manufacturer's Address |
|---|---|
| Bain's 8" regular worm | Grenada, Mississippi |
| Mann's Jelly Worm 8 | Eufaula, Alabame |
| Four Rivers, Hi-Jackers | Greenwood, Mississippi |
| Yum-Yum Worms | Fort Smith, Arkansas |
| Creme | Tyler, Texas & Toronto |
| Creme's 6" Scoundrel | Tyler, Texas & Toronto |
| Roger's Buck Pack | Lamar, Missouri |
| Real live worm | The garden |

It is believed that several factors are involved in the attraction of fish to a lure, including the visual appearance of the lure both at rest and in motion, the action or movement of the lure, the vibrations or noises produced by the moving lure, and the actual feel or reaction of the lure when contacted by the fish.

Known commercially available lures are sadly lacking in many if not all of the above described features which contribute to an effective and successful lure. Accordingly, it is a primary object of the present invention to provide a lure which not only is more effective for its basic purpose, that of attracting fish, but also significantly improves over known lures in each of those areas considered of particular importance in regard to the attraction of the fish to the lure.

In achieving the desired improvements, the body of the lure, that is, the portion between the head and tail thereof, is formed to include a slender central section approximately one-quarter inch thick for about one-third of the length of the body rearward of the head with the remainder of the central section tapering toward the tail to approximately a one-eighth inch thickness. The slender center section is surrounded by rings spaced anywhere from approximately 0.115 inch to approximately .125 inch along the length of the center section and projecting radially therefrom with the vast majority of the rings being of a height greater than one-sixteenth inch and up to one-eighth inch or possibly up to one-quarter inch. In the preferred embodiment, the center section and rings are formed integrally from a soft highly flexible resiliently elastic plastic, providing a high degree of maneuverability. Suitable elastomeric compositions may be compounded without undue experimentation. The thin rings, closely spaced along the slender center section, give the visual appearance of substantial bulk while at the same time not interfering with the very high flexibility of the lure which primarily results from the elongated slender center section.

The visibility of the lure is also enhanced by providing for the trapping of air bubbles by a surface tension effect between adjacent rings, the plastic used in the construction of the lure being non-wettable by water and either of an oily or dry formula. The air trapped between the rings tends to hold the tail of the lure high while the weight of the hook, embedded within the head end of the lure, holds the head low. This orientation helps to increase visibility and allows for a lifelike tail action. Further, the air bubbles, adhering between the rings or being released therefrom, will glisten with any available reflected light.

Several other significant advantages are attributable to the ability of the lure to retain air bubbles between the rings thereof. For example, the retained air bubbles will increase the buoyancy of the lure and cause the lure to sink more slowly. This in turn allows for the use of heavier weights so as to make for easier casting.

It has also been found, under specific carefully controlled test conditions, that upon a jerking of the lure, the body elongates slightly, releasing air bubbles which provide a further visual attractiveness to the fish and at the same time produce loud noises found to be detectable at distances in excess of 30 feet. Depending upon the force of the initial jerk on the line, sufficient air may be retained between the rings so as to allow three to six separate jerks prior to a release of all of the air.

The flexible evenly spaced thin ribs also contribute significantly to the generation of sound or vibrations, thereby providing a further attractiveness for the fish. In this regard, under further specific acoustic tests, the sound of the lure moving through water, when amplified, has been found to closely resemble the sound of a handsaw cutting a board with the actual intensity of the sound being substantially greater than that associated with any of the above commercially available products. The flexible ribs also produce a series of staccato impulses as they pass over obstacles, flexing easily so as not to snag the lure and providing for an agitated motion of the lure.

Another particular advantage associated with the thin deep ribbed construction resides in the fact that dough or dip bait can be filled into a portion of the ribs or rings as additional inducement to fish. Further, a significant "feel" is achieved due to the flexible resilient material of the lure and the size relationship between the ribs and the slender center section whereby a squeezing of the lure, such as occurs when a fish bites thereon, results in a reaction of the lure itself which simulates a crawling or wiggling motion.

These objects and advantages, together with others which will become apparent from the following description, reside in the details of construction and manner of use of the lure as more fully hereinafter described and claimed. Reference is had to the accompanying drawings forming a part hereof wherein like numerals refer to like parts throughout, and in which:

FIG. 1 is a perspective view of a lure constructed in accordance with the present invention with a hook mounted in operative position therein;

FIG. 2 is an enlarged longitudinal cross-sectional view through the lure of FIG. 1;

FIG. 3 is a transverse cross-sectional view taken substantially on a plane passing along line 3—3 in FIG. 2;

FIG. 4 is a cross-sectional view through a modified form of lure wherein the body of the lure, including the center section and ribs, are of a general oval configuration;

FIG. 5 is a perspective detail of a modified form of tail;

Figure 6:
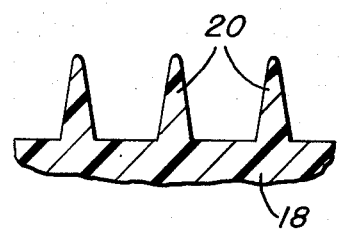
FIGS. 6, 7 and 8 are enlarged detail views of modified rib constructions.

Referring now more specifically to the drawings, reference numeral 10 is used to generally designate a lure constructed in accordance with the present invention. The lure is preferably molded in one piece of a soft, resilient, flexible non-wettable plastic material.

The lure is configured somewhat in the manner of a natural worm and includes an elongated body 12 with a head 14 on one end thereof and a tail 16 on the opposite end. The body 12 includes a solid elongated central section 18 which will normally either maintain a maximum diameter, for example one-quarter inch, for one-third the length thereof inward of the head 14 and then taper to a minimum diameter at the tail end of, as an example, one-eighth inch; have a constantly tapering cross-section between the head 14 and the tail 16; or maintain a constant diameter cross-section throughout the full length of the center section 18. With reference to FIGS. 3 and 4, it is to be appreciated that the elongated center section 18 can, in cross-section, be either circular or oval. While such cross-sectional configurations are preferred, others may be used if deemed appropriate.

The elongated center section 18, throughout the full length thereof, is surrounded by a series of thin substantially flat annular rings or ribs 20 spaced from each other along the length thereof. The spacing between the rings, as well as the height thereof, can either remain constant or decrease slightly toward the reduced diameter tail end of the center section 18. The rings 20 will normally project more than one-sixteenth inch and up to one-quarter inch or more out from the center section 18 peripherally thereabout. The spacing between the rings will preferably be on the order of approximately 0.115 inches to 0.125 inches with the rings, in one embodiment, having a constant thickness throughout the height thereof of approximately 1/32 inch with a flat outer peripheral edge.

The head 14 and the tail 16 are integrally formed with the central body 12 and can assume various configurations compatible with the body construction. For example, as illustrated in FIGS. 1 and 2, the head can be of a forwardly directed generally rounded conical configuration having shallow peripheral grooves 22 thereabout. The tail 16 can be flat and of a generally hook configuration. Alternatively, as suggested in FIG. 5, the tail, designated as 16' therein, can be of a flat generally ellipsoidal configuration.

Figure 7:
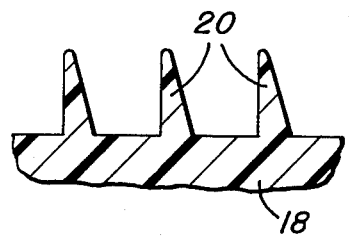
Figure 8:
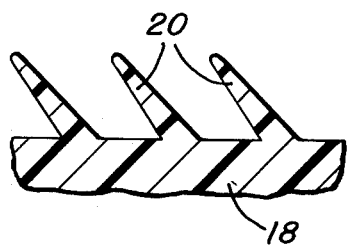

With reference to FIGS. 6, 7 and 8, it is to be appreciated that the actual configuration of the annular rings can vary slightly. In FIG. 6, the rings, in cross-section, are tapered with inclined forward and rear faces, terminating in a convex outer edge. In FIG. 7, the front face of each of the ribs is perpendicular to the central section while the rear face thereof inclines slightly, the ribs terminating in a convex outer edge. FIG. 8 illustrates ribs wherein the entire rib is angled forwardly along the length of the center section.

Figure 9:
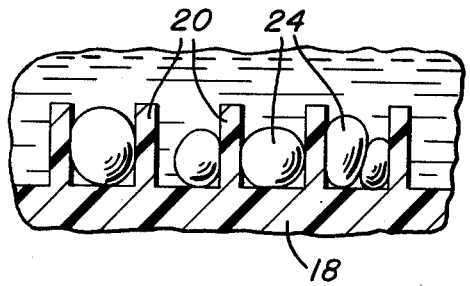
FIG. 9 is an enlarged detail of the ribbed construction of the embodiment of FIG. 2 illustrating the air trapping capabilities thereof.
Figure 10:
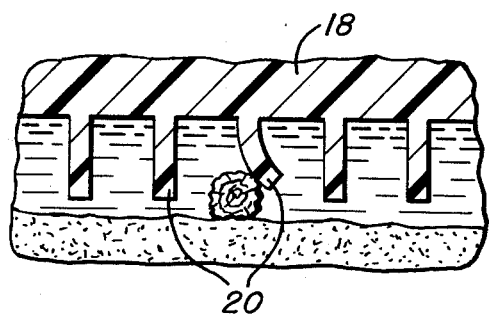
FIG. 10 is an enlarged detail view illustrating the flexing action of the ribs upon the encountering of an obstacle.

Significant advantages are derived from the specific ring size and configuration, the rings, even when incorporating inclined faces, projecting substantially perpendicularly to the center section. For example, as suggested in FIG. 9, the spacing and projection of the ribs is such so as to effectively trap air bubbles 24 therebetween and adjacent the center section. These air bubbles are carried down with the lure, thus tending to retard the sinking of the lure and in fact attractively orientating the lure generally vertically with the heavier hook end thereof directed downward and the tail end thereof suspended. The buoyancy provided by the air bubbles enables the use of heavier weights so as to facilitate casting. The retained air bubbles also reflect any available light, providing a sparkle effect which in turn results in increased visibility.

Under existing test conditions, it has been found that the air bubbles will remain trapped between the rings as long as the lure is pulled smoothly through the water. In other words, a fisherman can reel in the lure substantially any distance and it will remain "charged" with air until jerked or pulled sharply. Upon a sharp jerking of the lure, the bubbles, either all or a portion thereof, are released by the combined agitation of the lure and the tendency for the lure body to elongate. The released air bubbles, in addition to providing for a significant visual indication of the lure, have been found to produce a significant noise detectable, in one test situation, at distances in excess of 30 feet. The noises thus produced appear to be largely concentrated in the lower frequencies (below 6 kHz), and thus should be detected by fish which apparently hear best in a range of from 300 Hz to 6 kHz. This noise will provide an additional clue enabling fish to locate the lure more effectively. Once near the lure, the movement of the lure itself, the buoyancy thereof changing by the release of the air bubbles, will entice the fish to strike.

Other tests, conducted to evaluate the sound generated by the lure moving through water as opposed to that produced by the air release, have indicated that the intensity of the sound and vibrations generated is significantly greater than that produced by the more popular commercially available lures noted supra.

Such noise and vibrations generated by lures constructed in accordance with the present invention are periodic in character and in clearly indicated frequencies which depend upon the speed of the lure in the water. The amplified sound closely resembles the sound of a hand saw cutting a board. In this regard, the speed of the lure in water in many instances is similar to the speed of a hand saw when ripping a board, and the 0.115 inch to 0.125 inch normal spacing of the rings is close to the tooth interval on a hand saw. Of course the frequency of the sound impulses will depend upon the spacing of the rings. No known lure utilizes such wide, distinctly formed and highly flexible rings which completely surround a thin center section and as such, no known lure will generate sounds in any way similar to that of the present invention.

Also of particular significance with regard to the generation of sound by the lure is the fact that when the lure is dragged across an underwater twig or branch, or the corner of a sharp rock, the intermittent resistance offered by each ring passing over the obstruction generates an acoustic disturbance or vibration which is readily transmitted in the water. In one test, a three-eighth inch diameter stick was used. The sound generated was a series of staccato impulses which, when the speed was fast enough, was again similar to the sound of a hand saw but somewhat louder. In addition, it was noted that the intermittent resistance of each ring also agitated the motion of the worm, especially the tail, in a provocative manner which will attract attention by sight. By burying the hook in the center of the worm, as suggested in the drawings, the lure can be pulled through brush and weeds without difficulty. The rings also tend to make the lure weedless by offering a flexible array of rings to guide or glide the bait past obstructions. This result is achieved notwithstanding the fact that the rings give the lure an appearance of size which should be readily seen by fish. The system of annular rings, while allowing the lure to slither past obstructions, results in a slightly higher fluid resistance in water as opposed to a lure or worm having a smoother more streamlined shape. However, the slight extra work required in pulling the lure through the water actually assists in the generation of vibrations and acoustical signals in the water. Further, the water between the rings forced to move with the lure enhances the feel of the lure on the line, a desirable feature.

With reference to FIGS. 6, 7 and 8, if desired, a slight taper can be given to the front and/or rear faces of the rings. However, in all instances, the rings are to be quite thin, closely spaced and projecting at a sharp angle to the elongated center section. That is, the rings are specifically not merely rounded protuberances on the body, but actual thin spaced fin-like projections with the center section clearly exposed therebetween. By changing the inclination of the ribs from the perpendicular, as suggested in FIG. 8, various changes can be effected in the air retention capabilities and sound production effects.

While the lure has been described as integrally formed or molded of plastic as a highly resilient, elastic one-piece member, variations are contemplated. For example, the elongated center section 18 can be retained highly flexible, while the rings 20 thereon can be relatively stiffer or in fact rigid. By retaining the above preferred size relationships, the lure with rigid rings will retain the clear noise-producing capabilities as well as the ability to retain and, when sharply jerked, release air. Also, a degree of maneuverability will be retained.

Alternatively, the elongated slender center section 18 can be made rigid while the rings 20 retain the high degree of elastic resiliency and flexibility. In such case, while the overall maneuverability of the lure may be decreased slightly, the noise generation and bubble flow capabilities will be retained. In addition, the lure will still present the impression of bulk while easily moving over obstructions due to the flexing of the rings.

The foregoing is considered illustrative of the principles of the invention. As modifications and changes may occur to those skilled in the art, it is not desired to specifically limit the invention to the construction and operation shown and described, and accordingly, all suitable modifications and equivalents may be resorted to, falling within the scope of the invention as claimed.

What is claimed is:

1. A fishing lure comprising an elongated body having opposed ends defining a head end and a tail end, said body including an elongated slender full length center section and a series of annular rings affixed to and surrounding said center section at spaced points therealong, each of said rings including opposed substantially planar sides, each side projecting outwardly from said center section at a sharp angle thereto and at a point along the length of the center section spaced from the facing side of the adjoining ring, at least one of said center section or said series of annular rings being formed of a flexible and resiliently elastic material.

2. The fishing lure of claim 1 wherein at least one side of each ring is orientated in a plane perpendicular to the center section.

3. The fishing lure of claim 1 wherein said center section is formed of a flexible resiliently elastic material with the center section and rings being of one-piece construction.

4. The fishing lure of claim 1 wherein said center section is rigid.

5. The fishing lure of claim 1 wherein said center section is formed of a flexible and resiliently elastic material.

6. The fishing lure of claim 5 wherein said annular rings are rigid.

7. The fishing lure of claim 1 wherein said center section has a diametric cross-section within the approximate range of one-eighth inch to one-quarter inch.

8. The fishing lure of claim 7 wherein the ring projection of the majority of the rings from the center section is greater than one-sixteenth inch.

9. The fishing lure of claim 8 wherein the ring spacing of the majority of the rings is less than the ring projection from said center section.

10. The fishing lure of claim 1 wherein said body includes means for the selective retention and release of air bubbles along an appreciable portion of the length thereof.

11. The fishing lure of claim 10 wherein said means are also for the generation of noise and vibrations of a characteristic frequency.

12. The method of enhancing the fish attracting capabilities of a fishing lure comprising providing the lure with means of retaining air bubbles when submerged, submerging the lure and positioning the lure in a desired underwater location without agitation so as not to dislodge the air bubbles, and subsequently agitating the lure by temporary elongation thereof to release the air bubbles under water.

* * * * *